Jan. 28, 1969  W. H. SINK  3,424,288

CLUTCH WITH NOISE AND WEAR SUPPRESSION

Filed Dec. 29, 1966  Sheet 2 of 2

United States Patent Office 3,424,288
Patented Jan. 28, 1969

3,424,288
CLUTCH WITH NOISE AND WEAR SUPPRESSION
William H. Sink, Auburn, Ind., assignor to Dana Corporation, Toledo, Ohio, a corporation of Virginia
Filed Dec. 29, 1966, Ser. No. 605,674
U.S. Cl. 192—70.16   14 Claims
Int. Cl. F16d 11/06, 13/58, 65/10

ABSTRACT OF THE DISCLOSURE

A clutch comprising a flywheel and one or more axially extending driven friction disks is provided. The pressure plate of the clutch is resiliently urged into engagement with at least one of the friction disks and has, between its circumference and the circumference of the flywheel, a resiliently urged friction means serving as a vibration and tumbling arresting means to reduce wear and noise engendered by clutch operation.

---

This invention relates to a vibration suppression arrangement for clutches and more specifically to an antirattle structure providing positive centering of the intermediate plate in a clutch assembly.

Heavy duty clutches, generally, and specifically those of the two-plate configuration, are subject to tumbling and torsional activity of their parts at idle speed and torsional activity at higher speeds when the clutch is released. In such arrangements the intermediate plate of the two-plate clutch or the pressure plate of a single-plate clutch have a tendency to tumble at slow speed and a tendency to chatter or vibrate back and forth at high speed as the edges of its drive lugs abut against the opposite edges of the drive lug slots. The first of these motions (tumbling) is caused by gravity. In this movement the lug slots on the intermediate or pressure plate seek support from the pair of oppositely disposed horizontal lugs in the cover, which pair of lugs constantly change in vertical position during rotation, imparting a tumbling motion to the intermediate or pressure plate. The second of these motions is caused by a torque loading being imposed on the intermediate plate through the nonuniform rotation of the engine, flywheel, and cover, the intermediate or pressure plate attempting, at this time, due to inertia, to rotate uniformly. This condition provides a chattering or vibratory motion to the intermediate or pressure plate.

The unwanted tumbling and vibratory motion cause a "clunking" type noise in the clutch and, additionally, subject the clutch parts to undue wear. Although wearing can be provided for fairly satisfactorily by the use of strengthened structural members, recent developments in the engine field now provide much quieter running engines. This improvement in engines has rendered the intermediate or pressure plate torsional and tumbling caused noise an objectionable factor at engine idle conditions.

Although various arrangements for the suppression of tumbling, vibrations and rattling of clutch plates and clutch assemblies have been developed and are known to exist in the prior art, none of the known arrangements provide an extremely simple assembly which requires the use of no special mounting means and, therefore, is capable of utilizing standard clutch parts. Accordingly, it would be desirable to provide a clutch useable with the new quieter running engines and a clutch which, at the same time, had a simply mounted vibration suppression from which accrued the elimination of noise and a great deal of wear to the parts, thereby providing smoother and quieter running and an elongation of life for the clutch.

It is, therefore, an object of this invention to provide a clutch having a vibration suppression means.

It is an additional object of the invention to provide a clutch having a simplified and easily mounted vibration suppression means.

It is a still further object of the invention to provide a clutch having a vibration suppression means which requires that no special mounting be provided in the clutch.

It is an additional object of the invention to provide a clutch having a vibration suppression means which is easily and inexpensively manufactured and easily installed in a standard or production clutch.

In furtherance of the foregoing objects, a clutch comprising a driving member in the form of a flywheel that includes a pressure plate biased towards a pair of axially extending driven friction disks is provided. Disposed intermediate the flywheel and pressure plate are a series of axially extending compression springs disposed insertingly within each other and urging the pressure plate towards the driven disks. An intermediate plate is assembled between the friction disks having axial limited movement and provided with lug receiving grooves into which extend lugs fixed integral to the flywheel. Resiliently urged means serving as a vibration and tumbling arresting means are disposed between the outer circumference of the intermediate plate and the inner circumference of the flywheel. The resiliently urged means are placed in a position so that they engage against the flywheel and abuttingly impinge against the circumference of the intermediate plate reducing vibration and urging the intermediate or pressure plate towards an intermediate centered position to eliminate tumbling.

Further and additional objects and advantages of the instant invention will be had from the detailed description following the drawings appended thereto wherein.

Figure 2:
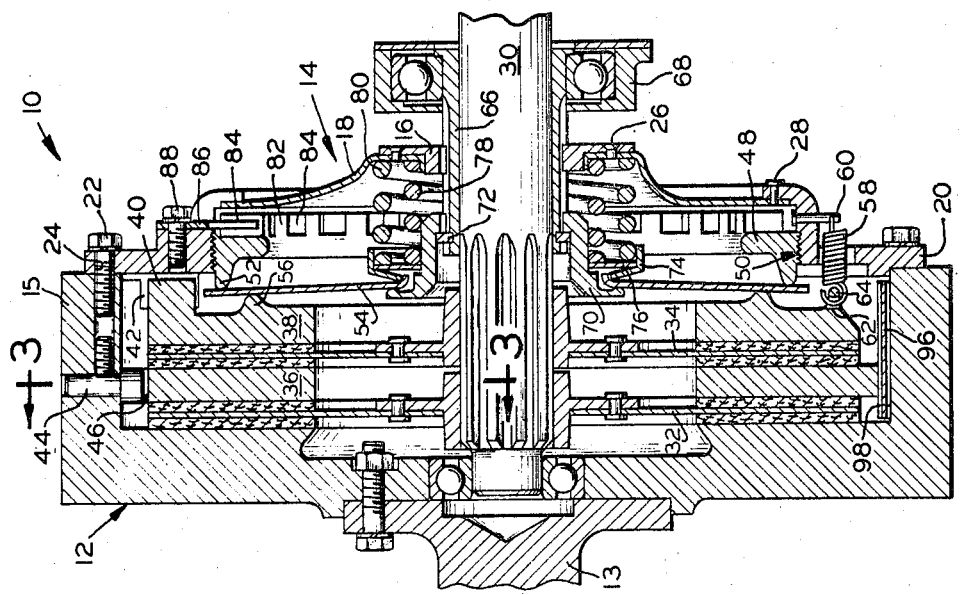
FIG. 2 is a sectional view of the invention taken on line 2—2 of FIG. 1.
Figure 1:
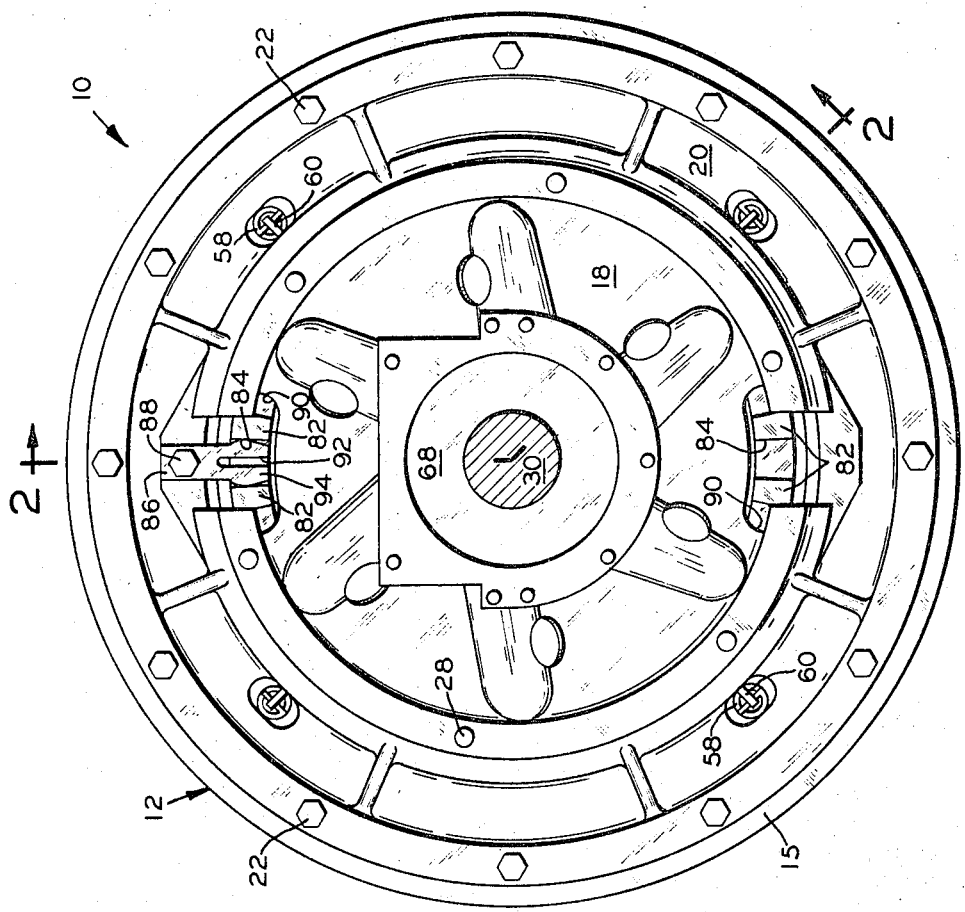
FIG. 1 is a plan view of the invention.

Referring now to the drawings for a better understanding of the invention, there is shown a spring loaded two-plate clutch 10 drivingly connected for unitary rotation with a flywheel 12 having a circular flange 15 supported from a driving shaft 13 that extends from an engine or prime mover (not shown). A 3-piece clutch cover 14, including a centrally internally splined annular portion 16, an intermediate portion 18 and an outer flange portion 20, is secured to the circular flange 15 by means of a plurality of bolts 22 passing through circumferentially spaced openings 24 adjacent the periphery of the flange 20 and threadedly secured in the flywheel. The cover portions 16 and 18 are interconnected by means of a plurality of circumferentially spaced rivets 26 and the portions 18 and 20 are interconnected by means of a plurality of circumferentially spaced rivets 28.

An output shaft, shown fragmentarily at 30, adapted to be clutched into a driving relationship with the flywheel 12, is piloted at its forward end in the flywheel and extends axially rearwardly therefrom through and radially spaced from the central annular portion 16 of the cover 14. A pair of driven members 32 and 34 are splined for unitary rotation and relative axial movement on the forward end of shaft 30 and are adapted to be pressed into driving engagement with the flywheel 12 and a limited axially movable intermediate plate 36 disposed therebetween. This movement is provided by an axially movable pressure plate 38. Pressure plate 38 is drivingly connected to the cover 14 by means of a plurality of lugs 40 extending axially from the rear surface thereof into registering slots 42 formed in the annular flange portion 20 of the cover 14. The intermediate plate 36 is drivingly connected to the flywheel by means of a plurality of drive pins 44 extending radially from the flywheel 12 and registering in drive slots 46 formed on the outer periphery of the intermediate plate 36.

Adjusting ring 48 is peripherally connected to flange portion 20 of the cover 14 by the threaded engagement shown generally at 50 so that circumferential movement of the ring 48 relative to the cover 14 results in axial movement of the ring relative to the cover and other portions of the clutch 10. An annular shoulder 52 extends axially forward from the adjusting ring 48 adjacent the periphery thereof and a plurality of radially extending clutch levers 54 pivotally engage the shoulder 52 and also engage an annular shoulder 56 formed on the rear face of the pressure plate 38 coaxially with the shoulder 52 and spaced radially inwardly therefrom. In this manner, forward movement of the inner ends of the levers 54 pivots the lever on a shoulder 52 and presses the levers on the shoulders 56 thereby urging the pressure plate 38 forwardly to press the driven members 32 and 34 into engagement with the flywheel 12. Rearward movement of the levers 54 allows a plurality of return springs 58 to bias the pressure plate rearwardly away from the driven member. One end of each of the return springs 58 is suitably secured to one of a plurality of shoulder pins 60 pressed through the cover 14 and extending radially therefrom. The other end of the return spring 58 engages an opening 62 formed in one of a plurality of bosses 64 extending axially from the rear face of the pressure plate 38.

Means is provided to urge the inner ends of the clutch levers 54 axially. More particularly, a hollow release sleeve 66 is rotatably mounted on the output shaft 30 for axial movement relative thereto. A throwout bearing 68 is secured to the sleeve 66 and is energized by a suitable linkage (not shown) to induce axial movement of the sleeve in a well known manner. The release sleeve 66 is splined for axial movement in the central portion 16 of the cover 14 and has splined to its inner end a flange lever retaining sleeve 70 which is secured against axial movement relative thereto by an annular snap ring 72. The inner ends of the levers 54 are disposed between the flange portion of the sleeve 66 and an annular lever fulcrum ring 74 surrounding the sleeve 66. An annular spring retaining ring 76 surrounds the sleeve 66 and abuts the fulcrum ring 74 and is pressed against the same by a pair of compression springs 78 and 80 compressed between the cover 14 and the spring retaining ring. The springs 78 and 80 urge the inner ends of the clutch levers 54 forwardly thereby biasing the pressure plate 38 toward the flywheel 12. Rearward movement of the release sleeve 66 pulls the inner ends of the levers 54 rearwardly against the bias of the springs 78 and 80 allowing the pressure plate 38 to be moved away from the flywheel 12 by the return springs 58.

Threaded adjustment between the adjusting ring 48 and the cover 14, shown generally at 50, is provided so that, upon rotation of the adjusting ring relative to the cover, the shoulder 56 on which the levers 54 pivot may be moved axially relative to the cover and the other components of the clutch thereby adjusting the throw of the clutch levers so that wear and loss of spring biasing effect may be compensated for.

Means is provided to lockingly secure the position of the adjusting ring 48 relative to the clutch collar 14. More particularly, the rear face of the adjusting ring 48 is provided with a plurality of bosses 82 projecting axially rearwardly therefrom defining therebetween a plurality of slots 84 substantially equal in width. A rod 86 is secured to the outer flange portion 20 of the cover 14 by means of a bolt 88 and extends radially inwardly through an opening 90 in the intermediate cover portion 18 so that its inward portion is disposed in the slot 84 between a pair of adjacent bosses 82. The rod 86 is provided with a medially positioned slot 92 extending radially outwardly from its end 94 which slot allows a portion of the rod 86 between adjacent bosses 82 to be resiliently circumferentially compressed. This arrangement is described in more detail in U.S. Patent No. 3,176,814 and owned by a common assignee.

Figure 3:
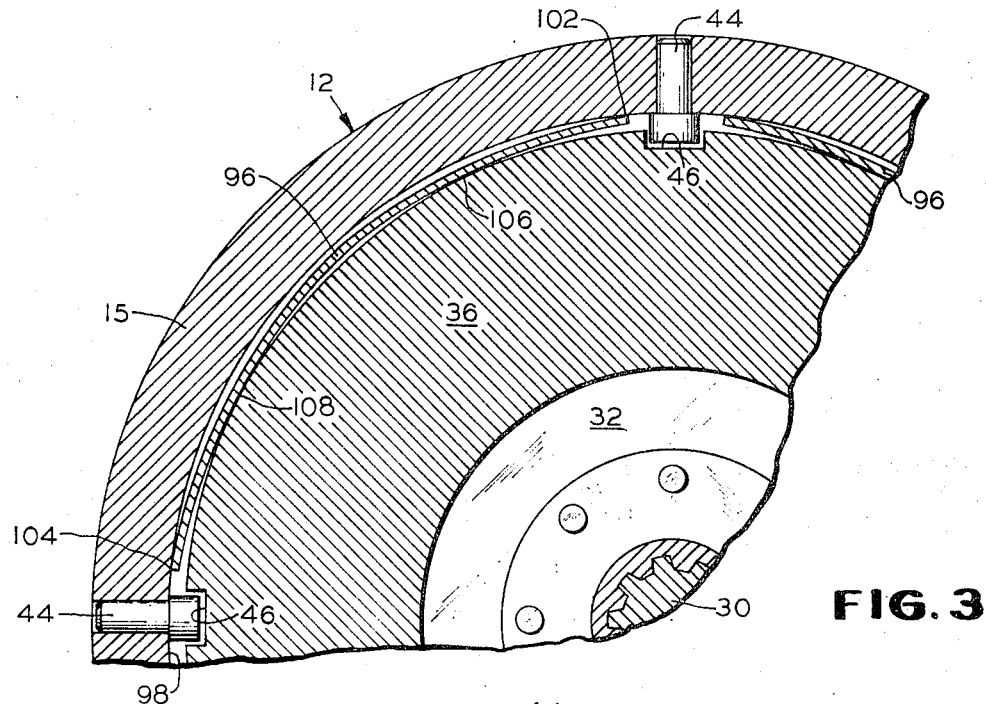
FIG. 3 is an enlarged partial sectional view taken on line 3—3 of FIG. 2 and showing the location of one of the leaf springs in one modification of the invention.

Because of the torque loading imposed on the intermediate plate 36, a clutch constructed insofar as herein related suffers from the aforementioned chattering and noise and consequent increase in wear on the moving parts. To prevent this, a plurality of leaf springs 96 are positioned between the inner periphery 98 of the circular flange 15 of the flywheel and the outer periphery of the intermediate plate 36. Each of these leaf springs is inserted intermediate the drive pins 44 on the flywheel and placed in compressed condition so as to be in non-engaging relationship with the drive pins 44. Each of the leaf springs 96 take the form of a continuous flat surface before compression and, as seen in FIG. 3, in compressed position, engages the inner periphery of the flywheel at its ends 102 and 104 and engages the intermediate plate by means of a pair of portions 106, 108 of the leaf spring which generally conform to the peripheral surface of the intermediate plate, the spring force imposed against the intermediate plate being insufficient to prevent disengagement of the clutch 10. Although any number of leaf springs 96 may be utilized, in the instant invention, one leaf spring is advantageously interposed in the area provided between each of the drive pins 44 to extend circumferentially therebetween so that a total of four are utilized in the instant clutch (only one being shown). Thus, the leaf springs 96 resiliently center the intermediate plate relative to the cover. The leaf springs 96 are made of a width approximating the distance from the flywheel face to the clutch cover assembly for axial centering thereof with the length of the leaf springs 96 being equal to the space between adjacent drive pins 44. Thus the leaf springs 96 are effectively contained within the clutch assembly and require no special provisions to locate them within the clutch.

The operation of the clutch 10, including the leaf springs 96, is now given. When the engine is in idle condition, tumbling of the intermediate plate 36 is resisted by the leaf spring 96 which is instantaneously the lowermost disposed spring during any portion of rotation or movement. The resistance offered by this spring is resilient so that there is a slight downward movement of the intermediate plate 36 but such movement is insufficient to permit impinging abutment of the driving pins against the slot edges and the initiation of tumbling movement. At the same time, each of the leaf springs 96 frictionally bears against the intermediate plate 36 and the circular flange 15 of the flywheel preventing torsional vibration or rattle between the drive pins 44 and drive slots 46. When the engine speed is increased substantially above idle conditions (approximately to 1100 r.p.m.) centrifugal force on the intermediate plate 36 tends to prevent tumbling so that the leaf springs 96 only function as a resiliently urged friction means for preventing torsion caused vibration or chattering.

Figure 4:
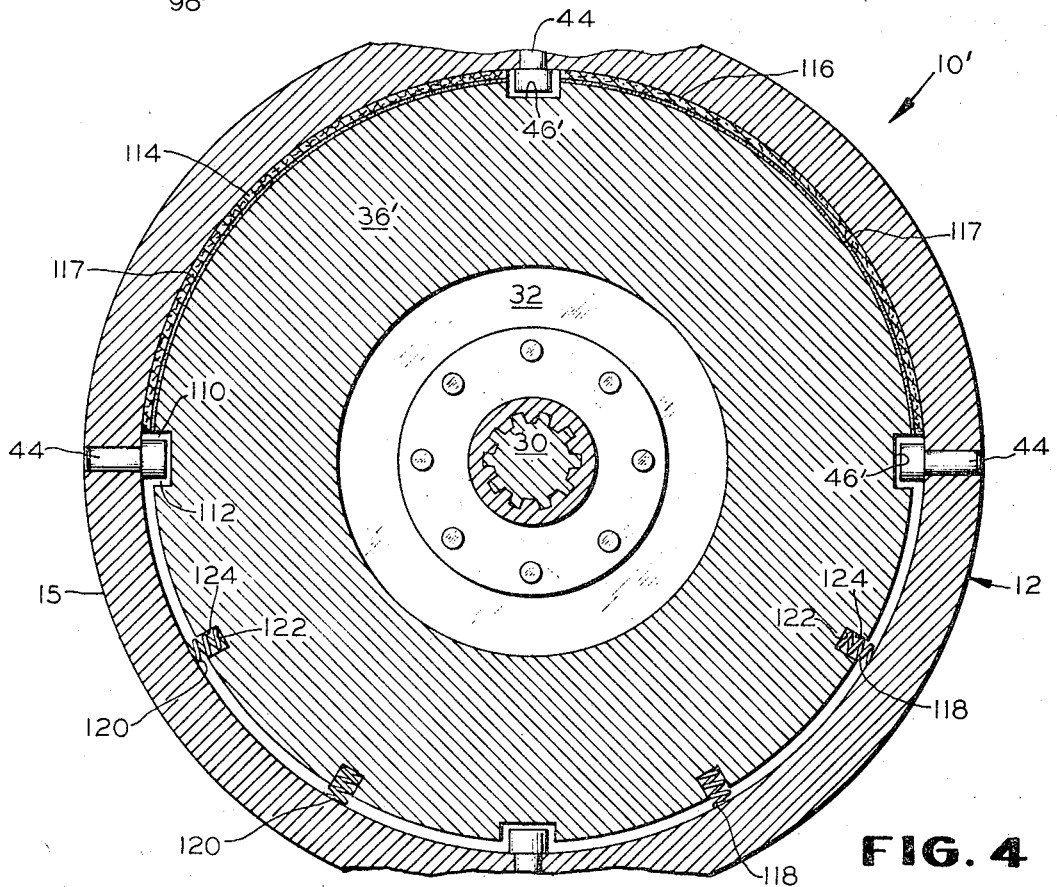
FIG. 4 is a sectional view of a further modification of the invention.

In a second embodiment of the invention, indicated generally at 10' in FIG. 4, an intermediate plate 36' having drive slots 46' of greater width than the slots 46 is provided so that drive pins 44 extending radially inward from the circular flange 15 of the flywheel 12 register with these slots. Clearances 110 and 112 on each side of the drive pin 44 are provided by this greater width so that the drive pin 44 is free to move a larger extent than the drive pin 44 of the first embodiment before engagement with the sides of the drive slots 46'.

A pair of damping means comprising friction pads 114 and 116 are bondingly attached to the intermediate plate 36 on opposite sides of one of the drive slots 46' by a resinous adhesive 117 and extend therefrom in opposite directions to approximately the location of the adjacent drive slots disposed on opposite sides of it. Each of the friction pads 114 and 116 centers the intermediate plate 36 by being forced into continuous frictional engagement with the circular flange 15 by a resilient biasing means comprising a pair of coil compression springs 118 and 120. It is to be understood that other springs such as leaf springs could be utilized for this purpose. Each of these springs is seated in a terminus 122 of a bore 124 in the intermediate plate 36' and is pilotingly held in compressed position within the bore by engagement of the outer end of the spring 118 or 120 with the flywheel 12. Springs 118 and 120 are of sufficient strength to constantly and resiliently urge the friction pads 114 and 116 against the flywheel thereby insuring that these friction elements provide a constant dampening between the intermediate plate 36' and flywheel 12.

The operation of the second embodiment of the invention is similar to that just described in relation to the first embodiment. Springs 118 and 120 constantly urge the intermediate plate 36' and friction pads 114 and 116 against the circular flange 15 thereby centering the intermediate plate 36' and preventing tumbling and dampening vibration caused by torsional loads.

It is to be understood that the foregoing disclosure is merely illustrative of the preferred embodiments of the invention and that the scope of the same is not limited thereby but is to be determined by the appended claims.

What is claimed is:

1. In a spring loaded clutch device comprising; (a) a drive member having a circular flange, (b) a driven member, (c) an engaging plate means rotatable with and axially moveable relative to the drive member, (d) resilient means operatively connected to said engaging plate means for urging said engaging plate means in a direction to press said driven member into engagement with said drive member, (e) said engaging plate means having a smooth circular outer periphery interrupted by equally spaced slots therein, (f) lugs extending from said circular flange into said slot means of said engaging plate means, (g) resiliently urged friction means disposed between said drive member circular flange and said circular outer periphery of said engaging plate means and extending circumferentially and substantially between said slot means, (h) whereby said resiliently urged friction means reduces torsional and tumbling induced rattle in said clutch.

2. The combination set out in claim 1 wherein said resiliently urged friction means comprises leaf spring means abutting said engaging plate and said drive member flange.

3. The combination set out in claim 2 wherein said leaf spring means comprises ends engaging said drive member flange and at least a portion abuttingly conforming to said periphery of said engaging plate.

4. The combination set out in claim 3 wherein a plurality of portion of said leaf spring conformingly engage against said periphery of the engaging plate.

5. The combination set out in claim 1 wherein said resiliently urged friction means comprises friction pad means abutting said engaging plate and said drive member flange.

6. The combination set out in claim 5 wherein said friction pad means are urged into engagement with said flange means by compression spring means seated in said periphery of the engaging plate means.

7. The combination set out in claim 6 wherein said compression spring means are oppositely disposed on said periphery relative to said friction pad means.

8. In a spring loaded clutch device comprising; (a) a drive member having a circular flange, (b) a plurality of driven members, (c) a pressure plate means rotatable with and axially moveable relative to the drive member, (d) intermediate plate means rotative with and axially moveable relative to the drive member and interposed between said driven members, said intermediate plate means having a smooth circular outer periphery interrupted by equally spaced slots therein, (e) resilient means operatively connected to said pressure plate means for urging said pressure plate means in a direction to press said driven members into engagement with said drive members and intermediate plate member, (f) lugs extending from said circular flange into said slot means of said intermediate plate means, (g) resiliently urged friction means disposed between said drive member circular flange and said periphery of said intermediate plate means and extending therearound between said slot means, (h) whereby said resiliently urged friction means reduces torsional and tumble induced rattle in said clutch.

9. The combination set out in claim 8 wherein said resiliently urged friction means includes leaf spring means abutting said intermediate plate means and said drive member flange.

10. The combination set out in claim 9 wherein said resiliently urged friction means includes ends on said leaf spring means engaging said drive member flange and at least a portion of said leaf spring means abuttingly conforming to said periphery of said intermediate plate means.

11. The combination set out in claim 8 wherein said resiliently urged friction means includes friction pads abutting said intermediate plate means and said drive member flange.

12. The combination set out in claim 11 wherein said friction pad means are urged into engagement with said flange means by spring means seated adjacent the periphery of said intermediate plate means.

13. The combination set out in claim 12 wherein said spring means are oppositely disposed on said periphery relative to said friction pad means.

14. In a spring loaded clutch device comprising; (a) a drive member having a circular flange, (b) a driven member, (c) an engaging plate means rotatable with and axially moveable relative to the drive member, (d) resilient means operatively connected to said engaging plate means for urging said engaging plate means in a direction to press said driven member into engagement with said drive member, (e) said engaging plate means having a smooth circular outer periphery interrupted by driving means mounted therewith, (f) engaging means for cooperating with said driving means mounted on said circular flange, (g) resiliently urged friction means disposed between said drive member circular flange and said periphery of said engaging plate means and extending circumferentially and substantially between said driving means, (h) whereby said resiliently urged friction means reduces torsional and tumbling induced rattle in said clutch.

References Cited

UNITED STATES PATENTS

| 924,397 | 6/1909 | Stacks | 192—68 |
| 1,490,967 | 4/1924 | Denneen et al. | 192—69 |

BENJAMIN W. WYCHE, *Primary Examiner.*

U.S. Cl. X.R.

192—70.29; 188—218